Feb. 23, 1954
G. A. UNGAR
2,670,314
METHOD FOR MAKING HONEYCOMB CORES
FOR SANDWICH TYPE STRUCTURES
Filed March 18, 1948
4 Sheets-Sheet 1
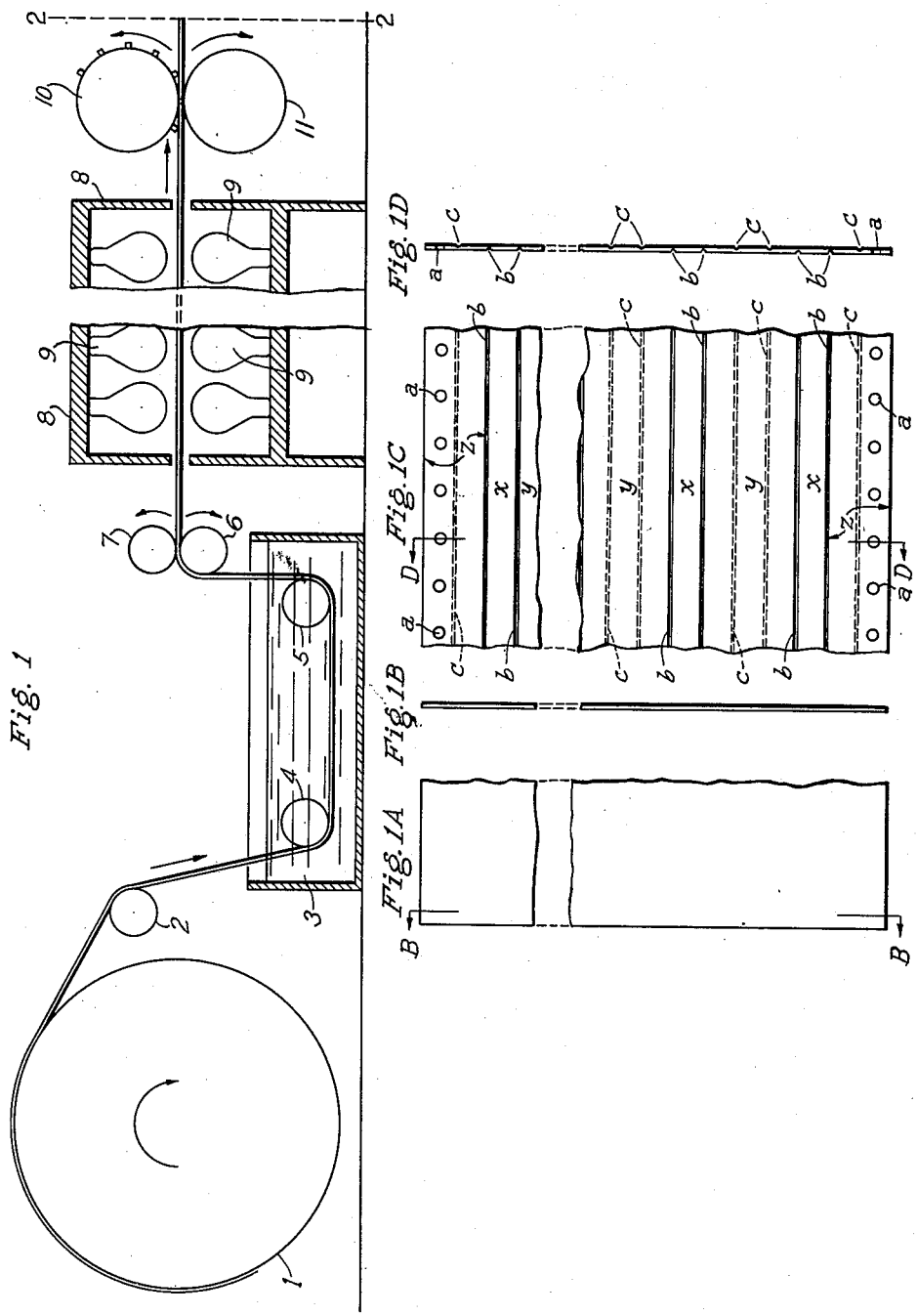
INVENTOR.
Gustave A. Ungar
BY
ATTORNEYS.

Feb. 23, 1954
G. A. UNGAR
2,670,314
METHOD FOR MAKING HONEYCOMB CORES FOR SANDWICH TYPE STRUCTURES
Filed March 18, 1948
4 Sheets-Sheet 2
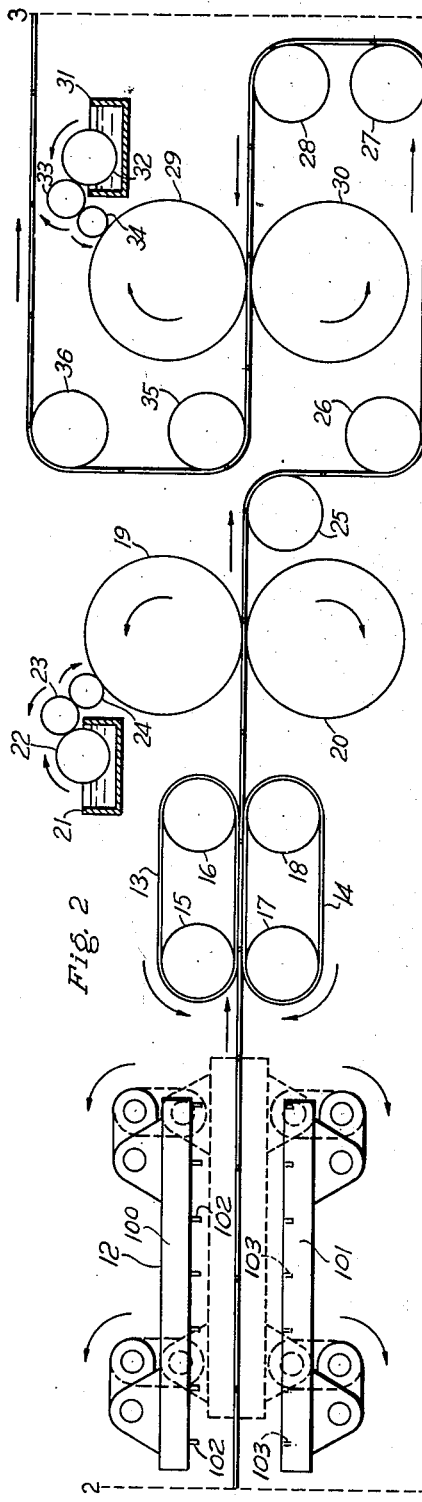
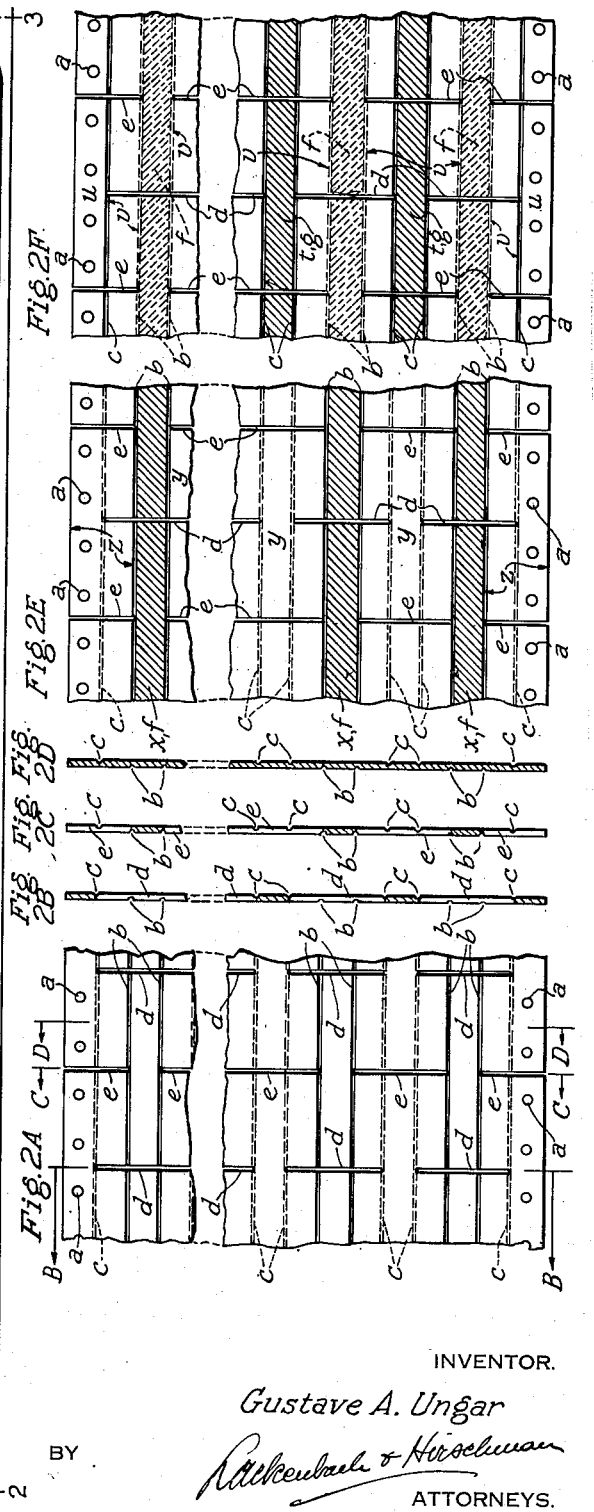
INVENTOR.
Gustave A. Ungar
BY
ATTORNEYS.

Feb. 23, 1954
G. A. UNGAR
2,670,314
METHOD FOR MAKING HONEYCOMB CORES FOR SANDWICH TYPE STRUCTURES
Filed March 18, 1948
4 Sheets-Sheet 3
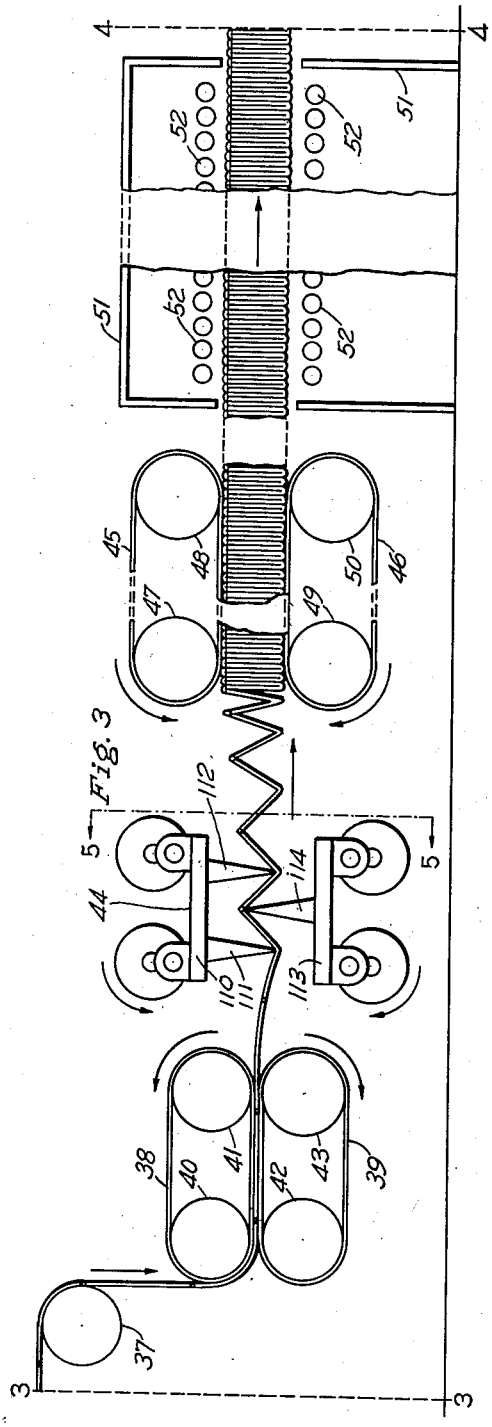
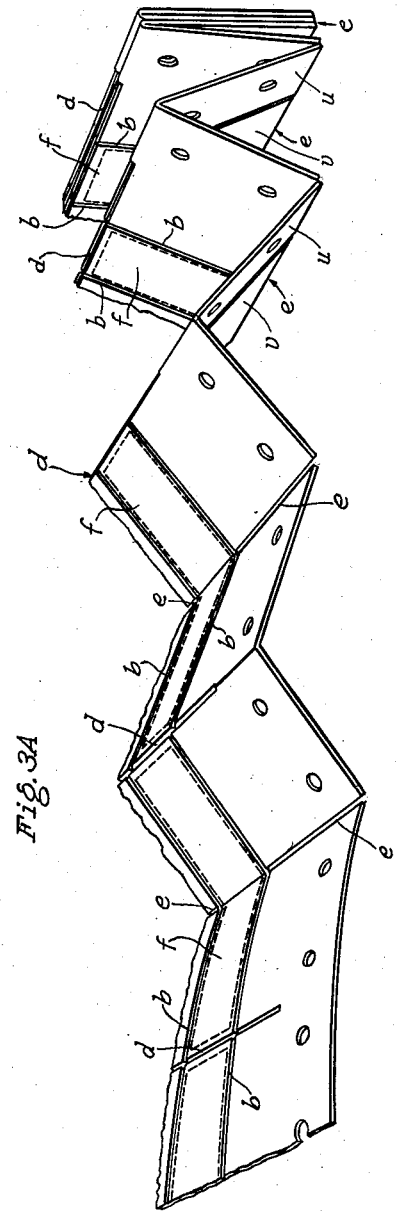
INVENTOR.
Gustave A. Ungar
BY Lackenbach & Hirschmann
ATTORNEYS.

Feb. 23, 1954
G. A. UNGAR
2,670,314
METHOD FOR MAKING HONEYCOMB CORES
FOR SANDWICH TYPE STRUCTURES
Filed March 18, 1948
4 Sheets-Sheet 4
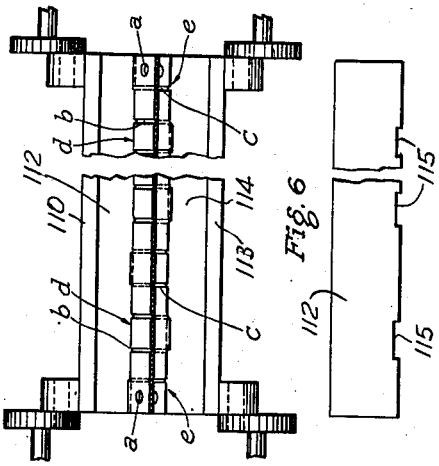
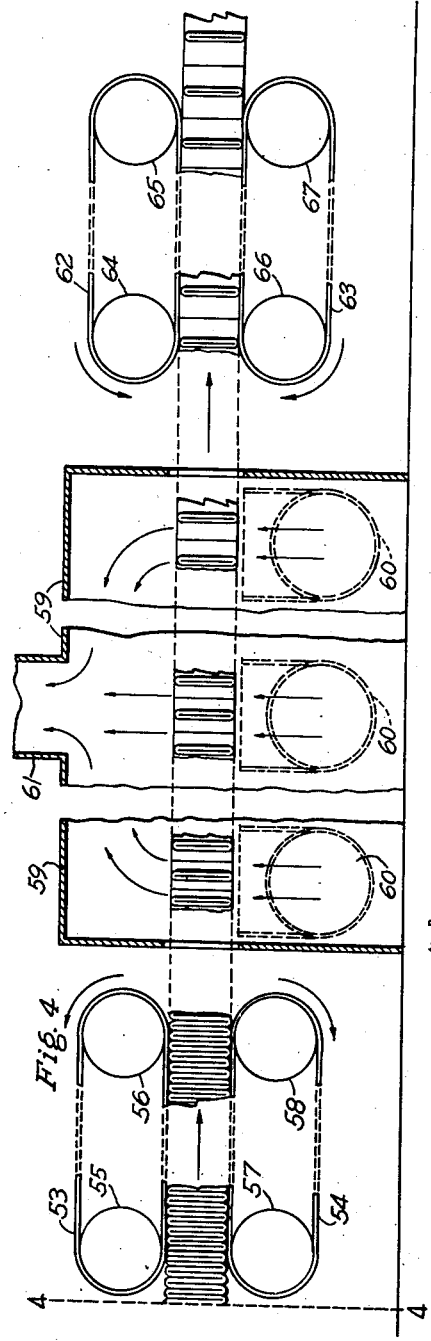
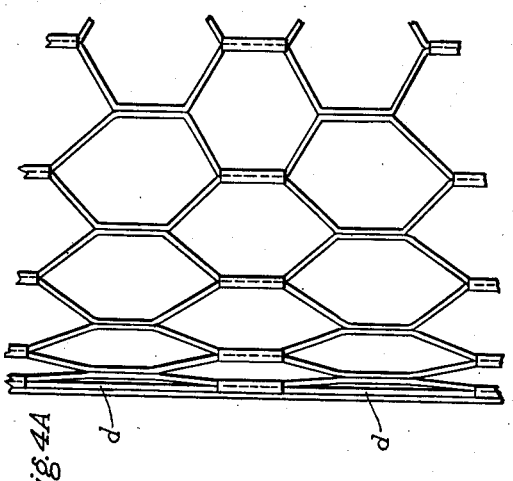
INVENTOR.
Gustave A. Ungar
BY
Lackenbach & Hirschman
ATTORNEYS.

Patented Feb. 23, 1954

2,670,314

UNITED STATES PATENT OFFICE 2,670,314

METHOD FOR MAKING HONEYCOMB CORES FOR SANDWICH TYPE STRUCTURES

Gustave A. Ungar, New Rochelle, N. Y.; Irma Ungar, administratrix of said Gustave A. Ungar, deceased, assignor to Douglas Aircraft Company, Inc., Santa Monica, Calif.

Application March 18, 1948, Serial No. 15,708

18 Claims. (Cl. 154—117)

The present invention relates to a method and apparatus for producing multi-cellular webs such as honeycomb filler or core for sandwich-type panels which are of light weight and yet capable of supporting substantial loads, as when utilized as structural elements. Such panels consist of a top and bottom layer of metallic or nonmetallic sheet material, such as thin sheet metal, plywood, plastic sheeting, or plastic-impregnated cardboard and the like, which layers encompass between them a honeycomb filler or core. Such filler or core may consist of a variety of materials which provides sufficient transverse strength in the structure in which they separate the end plates to which the filler or core is suitably attached.

The general object of the invention is to provide an improved method and apparatus for the manufacture of such a filler or core in a continuous operation from a single sheet of material, such as paper or fabric, impregnated with any suitable plastic reinforcing agent.

In the art of making honeycomb cores the usual practice has heretofore been as follows: A number of sheets, say, of paper or fabric, are striped in long parallel lines with adhesive on one or both sides, and a pile of such sheets is pressed to set the adhesive, thus resulting in a laminated pile of sheets each two adhering at the area of the striping. The honeycomb is made by cutting the stacks of sheets into the desired width, and then expanding or drawing the laminated pile as far apart as practicable, so that the nonadhering areas of the adjacent sheets bend with respect to the adhering areas thus forming a plurality of hexagonal cells. It is understood of course that the material, such as paper or fabric, is preferably impregnated with a suitable stiffening plastic or the like so that the formed honeycomb will retain its shape after expansion. After the cellular structure is obtained it is usually heated for the purpose of curing the impregnant, such structure then becoming permanent as to shape and ready for attachment thereto of the desired end plates.

The particular object of the present invention is to provide a method and apparatus for making such cores in a continuous process beginning with a single strip or web of the basic structural material, such as Kraft paper (as, for example, a roll of such material), and obtaining as an end product, a complete honeycomb core. The present invention envisages the impregnating of the paper, or other material, the application of adhesive thereto, the heat-treating of the core, and the final setting thereof in ultimate form, so that the end product is ready to be cut into desired sections and used in the building of sandwich-type structures.

Thus, the novel continuous method of producing such fillers or cores, in accordance with the invention, converts, in a steady flow of production, the original web of basic material into a finished core, to which, if desired, the end plates can be attached while the core emerges from the production line. In the utilization of my novel method and apparatus, there are no interruptions for manual handling of the material between the different manufacturing steps, and therefore the present excessive labor costs are greatly reduced and an end product of greater uniformity is secured with a minimum of waste, material, time, and labor.

The drawing illustrates a specific embodiment of apparatus in accordance with my invention:

Figs. 1 to 4, inclusive, each on a separate sheet, together provide a diagrammatic flow sheet of the method and apparatus of the present invention. For purposes of orientation a base- or floor-line is indicated in each figure. At the righthand side of Fig. 1 is a dotted line 2—2 corresponding to a dotted line 2—2 at the lefthand side of Fig. 2; and, accordingly, the lines 3—3 of Figs. 2 and 3, and the lines 4—4 of Figs. 3 and 4, correspond. Thus the four figures may be matched to provide a continuous diagram.

Figs. 1A, 1B, 1C, 1D, 2A, 2B, 2C, 2D, 2E, 2F, 3A, and 4A are details illustrating the condition of the stock from which the core is made at various stages of the production process. These figures are more particularly described below.

Fig. 5 is the vertical section 5—5 of Fig. 3.

Fig. 6 is an elevational view of one of the upper blades carried by the apparatus illustrated in Fig. 5.

The method of the present invention as illustrated in the drawing involves the following operations which are first briefly described in the order in which the same take place. In the drawing arrows indicate the directions of motion.

The stock from which the core is to be made, and which may be Kraft paper, fabric, or other suitable sheet material, is fed into the train of apparatus of the present invention from, preferably, a mill roll, such as indicated at 1, in Fig. 1.

The stock in web form is first carried over an aligning roller 2 down into a tank 3 containing an impregnant with which the stock is to be treated. Such impregnant might well be an aqueous solution of phenolic plastic. In Fig. 1 the web is shown to be carried down beneath two submerged rollers 4 and 5. After the web emerges from the bath, excess liquid impregnant is squeezed off by means of presser rollers 6 and 7, the excess impregnant draining back into the tank 3.

The stock is next carried through a suitable oven 8 having infrared lamps 9 therein for the purpose of partially drying but not curing the impregnant. If desired, other types of heating means could be employed for drying the impregnant.

The stock or web is then carried between two cooperating rollers 10 and 11, as shown in Fig. 1, the former being provided with punches (only a few being shown in Fig. 1) set at either end thereof at regular angular intervals, and arranged to cooperate with registered sockets (not shown) in roller 11 so that the opposite marginal edges of the stock are each perforated with a row of equally spaced aligned holes $a$ (cf. Fig. 1C). These holes may be relied upon subsequently in the apparatus train fitted with rollers or other advancing means having pins engageable in the holes to insure travel of the stock through certain parts thereof at a predetermined rate of speed and to prevent slipping and misregister of the stock at various stages of the fabrication process. Rollers 10 and 11 may be provided with spaced circumferential scoring ridges, not shown, so that the stock may be scored on both sides with longitudinal scores as it passes through these rollers.

Fig. 1A shows a fragment of the stock in plan before it has entered between rollers 10 and 11; Fig. 1B is the section B—B of Fig. 1A. Fig. 1C shows a fragment of the stock in plan after it has passed between rollers 10 and 11; Fig. 1D is the section D—D of Fig. 1C. Figs. 1C and 1D show the relative spacements of the holes $a$ and the longitudinal scores.

The scores are equally spaced, and each alternate pair of scores is made upon a different surface of the stock (cf. Fig. 1D, a sectional view). The scores upon the upper, i. e., near, surface of the stock, as shown in solid lines in Fig. 1C, are designated $b$; those on the under side, as shown in dotted lines in the same figure, are designated $c$. See also Figs. 2E and 2F, the first being a plan view of a fragment of the stock seen from the upper side, and the second being a plan view from beneath.

Thus each surface of the web or stock is scored so that two intervals of spacement appear, one being equal to the basic score interval, and the other three times as great. See Fig. 1C. The scores divide the two surfaces into parallel bands. The narrow bands of the upper surface are designated $x$, the wide bands $y$, and the marginal bands of this surface $z$. The narrow bands of the under surface are designated $t$, the wide bands $v$, and the marginal bands $u$ (see Fig. 2F). The purpose of scoring the stock, as will be understood, is to form lines of weakness which facilitate a subsequent bending thereof along such lines in forming the cellular core structure. In Figs. 1C and 1D it is readily seen that a narrow band on one surface of the stock is centrally disposed with respect to a wide band on the other surface, and vice versa. In other words, the pairs of scores on one face of the web or stock are laterally spaced in staggered relationship with the pairs of scores on the opposite face of the web.

The stock is next carried into apparatus at 12, more particularly described below, which slots the stock transversely while the same is in motion, to provide the stock with alternate rows of slots $d$ and $e$, the slots of one row being staggered with respect to those of adjacent rows, as shown in Fig. 2A. The length of any slot, except that of a marginal slot, is equal substantially to thrice the basic score interval. Slots $d$ are centered with respect to wide bands $v$ of the under surface of the stock; slots $e$ are centered with respect to wide bands $y$ of the upper surface of the stock.

After the stock is slotted it is carried forward by means of friction belts 13 and 14, which are respectively mounted on pulleys 15 and 16 and pulleys 17 and 18. Although not shown, these friction belts are driven preferably at the same rate of speed as the rate of forward movement of the mechanism 12.

Next the stock is carried between a coating roller 19 and a pressure roller 20, where the upper surface of the stock is striped intermittently with a thermo-setting adhesive along bands $x$. See Fig. 2E, in which the intermittent adhesive striping is designated $f$. In Fig. 2E, the adhesive striping $f$ is indicated by hachure which for convenience extends from score to score and from slot to slot, but, in practice it is desirable that the striping be intermittent so that adhesive is not impressed upon the stock sufficiently close to the edge of a slot to leak thereinto and through to the reverse surface. In Fig. 3A, a figure showing part of the stock on a much enlarged scale, the adhesive stripping $f$ is indicated by dotted outline, and it is seen that the edges of the intermittent striping do not coincide with the scores $b$ and slots $d$.

The coating roller 19 is appropriately arranged with interrupted circumferential lands for the purpose of applying the adhesive stripe $f$; but no detail of the face of the roller is shown. Roller 19 is fed in the manner known to the art with adhesive from a well 21 by means of a dipping roller 22 and two transfer rollers 23 and 24. Roller 19 is preferably given a slight axial reciprocating motion to insure good spreading of the adhesive.

After the upper surface of the stock has been coated with the adhesive the stock is reversed, as shown in Fig. 2, by being carried over and around rollers 25, 26, 27, and 28. Preferably the latter three of these rollers are provided with circumferential lands divided by grooves so that the rollers contact the stock only at areas where the adhesive is not present. The stock, now reversed, is passed between another adhesive applying roller 29 and a pressure roll 30, this latter preferably provided with circumferential grooves which permit passage of the stock without smearing the previously applied adhesive. Roller 29, having interrupted circumferential lands, similar to those of roller 19, operates to stripe, intermittently, the other surface of the stock with adhesive along bands $t$. Fig. 2F shows the lower surface of the stock in plan after both sides have been striped with adhesive. The dotted hachure indicates, here, the previous striping on the bands $x$. In Fig. 2F the intermittent adhesive stripes on bands $t$ are designated $g$. The roller 29, as seen in Figure 2, is supplied with adhesive from a well 31 by means of a dipping roller 32 and two transfer rollers 33 and 34.

Thereafter the stock is again reversed, only for the purpose of continuing the same in the original direction of travel, by means of rollers 35 and 36, and is passed over roller 37, which are preferably grooved circumferentially to avoid the adhesive stripings, and between a set of multiple feed belts 38 and 39, respectively mounted on pulleys 40 and 41 and pulleys 42 and 43. It will be understood that now, as the stock has adhesive on both sides thereof, it is desirable that the feed belts do not contact the coated surfaces. Thus the feed mechanism preferably comprises a plurality of parallel V-belts, each having an exposed surface of width slightly less than thrice the basic score interval, the belts 38 being staggered with respect to belts 39 so that the former contact the upper surface of the stock within the bands $y$ and the latter contact the lower surface of the stock within the bands $v$, neither set of belts thereby contacting the interrupted adhesive stripings.

Subsequently the stock is passed through apparatus designated in its entirety 44, and more particularly described below, which operates to bend or fold the web transversely in different directions at the alternate rows of slots, as shown in Fig. 3 (see, also, Fig. 3A, which shows a portion of the stock in perspective and illustrates the steps of forming the stock into pleats or folds).

As will be seen, the opposed members performing the folding are synchronized in relation to each other and to the rate of movement of the web in such a manner as to invariably fold the advancing web alternately in opposite directions transversely of the web at the lines of slots to continuously produce a fan-folded pack while the web is advancing. The web is so fan-folded, referring now to Figure 3A, that the first folding operation brings together the unincised adhesive stripes on the one face of the first two fold portions and the second folding brings together the unincised adhesive stripes on the opposite faces of the next two fold portions, and so on alternately, to the end that the finished pack can be expanded without rupturing any portion of the web.

Beyond the apparatus 44 the pleated stock is received between two additional feed belts 45 and 46, respectively mounted on pulleys 47 and 48 and pulleys 49 and 50, which belts are spaced from each other by a distance substantially equal to the height of the desired core, i. e., a distance substantially equal to the interval between the rows of slots $d$ and $e$. Belts 45 and 46, driven of course at the same rate of speed, have a common velocity sufficiently less than that of the stock during its previous travel through the train of apparatus to cause the pleated stock to bank, as shown in Fig. 3, so that each intermittent adhesive stripe $f$ and $g$ is forced against itself between the pleats of the stock and is so bonded. The web or stock, with its various pleats banked, and, in part, adhering each to the other, is next carried through an oven 51 wherein suitable heating elements, as, for example, high frequency inductors 52, heat the stock, dry the adhesive, and make the bond between the adhering portions of the pleats permanent, while the stock is fully compressed in pleated form between belts 45 and 46 and another set of belts 53 and 54 respectively mounted on pulleys 55 and 56 and pulleys 57 and 58. In order to keep the pleats of the stock banked under compression while the latter is passing through the oven 51 the velocity of the belts 53 and 54 is somewhat less than that of the belts 45 and 46. If desired, the impregnant may be fully cured during this step of the method merely by providing a temperature within the oven 51 sufficient to fully cure the impregnant as the folded web moves through the oven. As will be explained below, if the impregnant is fully cured in the oven 51, it is preferred to soften the pleats of the folded pack before completing the expanding operation.

Beyond belts 53 and 54 the web or stock passes into an oven 59 having hot air or steam ducts 60 feeding thereinto and a chimney 61 wherein the impregnant may be cured, if the same has not been fully cured in the oven 51, or wherein, if the impregnant is fully cured, the stock itself may be softened (by steam) to prevent its tearing subsequently when the pleats are expanded to form a honeycomb-like structure. Beyond the oven 59 the web is engaged by another pair of feed belts 62 and 63 respectively mounted on pulleys 64 and 65 and pulleys 66 and 67. The speed of belts 62 and 63 is sufficiently in excess of that of the belts 53 and 54 to effect an expansion of the stock between the two pairs of belts. Thus the banked pleats of the web are subjected to moments tending to open said pleats, but the adhering inner surfaces of the pleats cause the pleats to open only at the nonadhering portions thereof, thereby forming a honeycomb-like structure, as indicated in Fig. 4A. It will be understood of course that the length of the train of apparatus is not intended to be indicated by the drawing, and that suitable intervals between the individual apparatus are assumed to exist. These intervals, of course, relate back to the character of the adhesive and impregnant employed, the amount of heat required at the various stages, and the speed of operation.

It is of course desirable that all stretching and distorting of the web or stock be at an end when the impregnant is completely cured to avoid fracturing the stock itself. It is sufficient for the purposes of the present invention that the apparatus illustrated in Fig. 4 is so arranged that the web or stock passes into the oven 59 in a fairly expanded condition and leaves said oven with the impregnant fully cured.

The apparatus designated in its entirety as 12, Fig. 2, is essentially a male die 100 and a cooperating female die 101, each of which is carried on a pair of four parallel crankshafts, as indicated. Once each revolution of the shafts, which are synchronized, the dies clamp the stock between them while the latter is in motion, and the male elements 102 (punches) of die 100 pierce the stock and enter sockets 103 of die 101. Modifications will be apparent. I have here shown an extremely elementary arrangement of apparatus for slotting the stock while the same is in motion.

The apparatus designated in its entirety 44, Fig. 3, comprises a plate member 110 having two blades 111 and 112 rigidly fixed thereto, and another plate member 113 having an oppositely disposed blade 114 rigidly fixed thereto and centrally disposed with respect to the first mentioned blades. Both plates are mounted on crank shafts, and the shafts rotate synchronously. Once each revolution the blades assume the position indicated in Fig. 3, and bend the web or stock in alternate directions at each alternate row of slots. Fig. 6 shows blade 112 by itself in elevation; Fig. 5 is the elevational and sectional view indicated by line 5—5 of Fig. 3. It will be noticed in Fig. 6 that the edge of the blade 112 is stepped back at intervals so that the edge will not contact the several segments of the interrupted adhesive stripes when bending the stock. Blades 111 and 114 are similarly formed, except that, of course, blade 114 has step-backs staggered with relationship to those of blades 111 and 112.

I claim:

1. Method for the continuous production of a core for sandwich-type structures from an elongate web of material being fed continuously which comprises scoring said web on both sides with a series of longitudinal scores in pairs, the pairs of scores on one side being located midway between the pairs of scores on the other side; slotting said web with a series of parallel transverse rows of slots, the slots of any row being staggered with respect to slots of adjacent rows, and the slots of every other row being separated by the space between pairs of scores on one side of said web and the slots of the other rows being separated by the space between pairs of scores on the other side of said web; applying on both sides of said web longitudinal stripes of adhesive between each pair of scores thereon; continuously pleating the advanced portion of said web by bending it in alternate directions at each alternate row of slots; continuously backing up the pleats so formed, one upon another, by retarding their rate of travel relative to that of the unpleated portion of said sheet; causing the pressing of said pleats upon one another by still further retarding their rate of travel, thereby bonding within each pleat one portion of each of the stripes of adhesive to another portion thereof; and increasing the rate of travel of the compressed, interruptedly bonded pleats to separate the unbonded portions thereof, thereby expanding the pleats into a honeycomb-like structure.

2. Method of claim 1, wherein, in continuously pleating the advanced portion of said web by bending it in alternate directions at each alternate row of slots, the bending of said sheet is effected so that within each pleat each stripe of adhesive is bent midway between slots that it intersects.

3. Method of claim 1, wherein said stripes of adhesive are interrupted at their intersections with the various slots by intervals slightly greater than the width of said slots, thereby preventing the applied adhesive from entering said slots.

4. Method of claim 1, wherein said stripes of adhesive are interrupted at their intersections with the various slots by intervals slightly greater than the width of said slots, thereby preventing the applied adhesive from entering said slots, and, wherein, in continuously pleating the advanced portion of said web by bending it in alternate directions at each alternate row of slots, the bending of said web is effected so that within each pleat each segment of the interrupted stripes of adhesive is bent midway between two slots.

5. Method of claim 1, wherein said web is first impregnated with a thermo-setting reinforcing agent.

6. Method of claim 1, wherein said web is first sprayed with a thermo-setting reinforcing agent.

7. Method of claim 1, wherein said web is first impregnated with a thermo-setting reinforcing agent, and said agent is next dried.

8. Method of claim 1, wherein in increasing the rate of travel of the compressed, interruptedly bonded pleats to separate the unbonded portions thereof, thereby expanding the pleats into a honeycomb-like structure, applying heat to said material for the purpose of setting said adhesive.

9. Method of claim 1, wherein, in increasing the rate of travel of the compressed, interruptedly bonded pleats to separate the unbonded portions thereof, thereby expanding the pleats into a honeycomb-like structure, steaming said material for the purpose of preventing the same from tearing.

10. Method of claim 1, wherein said web, as it is scored, is formed along the opposite marginal edges thereof with pin engaging apertures for maintaining proper registry of said web as the same is thereafter advanced by pin carrying advancing means.

11. The method of making a honeycomb core from a web, comprising: advancing the web into the zone of operations; scoring said web on opposite faces thereof with a series of longitudinal scores in pairs, the pairs of scores on one face of said web being laterally spaced in staggered relationship to the pairs of scores on the opposite face; forming transversely extending lines of slots in the advancing web at longitudinal equidistant stations thereof, with the slots in adjacent rows mutually laterally staggered; the slots of every other row being separated by the space between pairs of scores on one face of said web and the slots of the other rows being separated by the space between pairs of scores on the other face of said web; applying to opposite faces of the advancing web longitudinally extending lines of adhesive material with the lines on the one face laterally spaced in staggered relationship to the lines on the opposite face; pleating the advancing web by bending the same alternately in opposite directions on said lines of slots; stacking the folds contiguously by retarding the advance thereof to unite the same on said lines of adhesive material to form the web into a fan folded article; and thereafter expanding said fan folded article to form a honeycomb having a multiplicity of cells the walls of which are defined in part by the scores.

12. The method of making a honeycomb core from a web, comprising: advancing the web into the zone of operations; forming on opposite faces of the advancing web a series of longitudinally extending lines of weakness in pairs while simultaneously perforating the opposite marginal edges of said web to cooperate with pin-carrying advancing means as said web is thereafter advanced by said means, impregnating the advancing web with a thermo-setting reinforcing agent; drying said agent as said web is passed through a drying zone, each pair of adjacent lines of weakness on one face of said web being laterally spaced in staggered relationship to pairs of adjacent lines on the opposite face; forming transversely extending rows of slots in the advancing web at longitudinal equidistant stations thereof with the slots in adjacent rows so mutually staggered laterally that the slots of every other row are separated by the space between pairs of lines of weakness on one face of said web and the slots of the other rows are separated by the space between pairs of lines of weakness on the other face of said web; applying to opposite faces of the advancing web longitudinally extending stripes of adhesive material with the stripes on the one face laterally spaced in staggered relationship to the stripes on the opposite face; folding the advancing web alternately in opposite directions on said lines of slots; stacking the folds contiguously to unite the same on said stripes of adhesive material as said folded web is continuously advanced to form the web into a fan folded article; and thereafter expanding said fan folded article to form a honeycomb having a multiplicity of cells, the walls of which are defined in part by the lines of weakness and in part by the united sections of the folds.

13. The method of making a honeycomb core from a web, comprising: advancing the web into the zone of operations; forming on opposite faces of the advancing web a series of longitudinally extending lines of weakness in pairs, each pair of adjacent lines on one face of said web being laterally spaced in staggered relationship to pairs of adjacent lines on the opposite face; forming transversely extending rows of slots in the advancing web at longitudinal equidistant stations thereof with the slots in adjacent rows so mutually staggered laterally that the slots in one of said adjacent rows are intersected by pairs of adjacent lines of weakness on one face of said web and the slots in the other of said adjacent rows are intersected by pairs of adjacent lines of weakness on the other face of said web and so spacing said slots that the slots of every other row are separated by the space between pairs of lines on one face of said web and the slots of the other rows are separated by the space between pairs of lines on the other face of said web; applying to opposite faces of the advancing web longitudinally extending stripes of adhesive material substantially equal in length to the distance between alternate rows of slots and of a width equal to the distance between pairs of adjacent lines of weakness with the stripes on the one face laterally spaced in staggered relationship to the stripes on the opposite face; folding the advancing web alternately in opposite directions on said lines of slots stacking the folds contiguously to unite the same on said stripes of adhesive material as said folded web is continuously advanced to form the web into a fan folded article; and thereafter expanding said fan folded article and bending each fold at the lines of weakness to form a honeycomb having a multiplicity of cells.

14. Method of making a honeycomb from an elongate web, comprising, the steps of: advancing an elongate web impregnated with a thermo-setting reinforcing agent into the zone of operation; incising the advancing web on transversely extending longitudinally equidistant segmental lines; applying to opposite faces of the advancing web longitudinally extending lines of layer uniteable material with the lines on one face of the web laterally spaced in staggered relationship to the lines on the other face; folding the web alternately in opposite direction along said incision lines; stacking the folds contiguously to unite the same on said lines of uniteable material to form a lengthwise compact depthwise and breadthwise multi-cellular mass of a thickness equal to the distance between said incision lines; heating said web to cure said impregnate; and thereafter softening the impregnated web while expanding the thus processed mass to form a honeycomb.

15. The method of making a honeycomb core, comprising: advancing an elongate web impregnated with an uncured thermo-setting reinforcing agent into the zone of operations; scoring said web on opposite faces thereof with a series of longitudinal scores in pairs, the pairs of scores on one face of said web being laterally spaced in staggered relationship to the pairs of scores on the opposite face; forming transversely extending lines of slots in the advancing web at longitudinal equidistant stations thereof, with the slots in adjacent rows mutually laterally staggered; the slots of every other row being separated by the space between pairs of scores on one face of said web and the slots of the other rows being separated by the space between pairs of scores on the other face of said web; applying to opposite faces of the advancing web longitudinally extending lines of adhesive material with the lines on the one face laterally spaced in staggered relationship to the lines on the opposite face; pleating the advancing web by bending the same alternately in opposite directions on said lines of slots; stacking the folds contiguously by retarding the advance thereof to unite the same on said lines of adhesive material to form the web into a fan folded article; heating said pleated web to cure said reinforcing agent; and thereafter steaming said pleated web to soften the same while expanding said pleated web to form a honeycomb having a multiplicity of cells the walls of which are defined in part by the scores.

16. The method of making a honeycomb core comprising: advancing an elongate web impregnated with an uncured reinforcing agent into the zone of operations; scoring said web on opposite faces thereof with a series of longitudinal scores in pairs, the pairs of scores on one face of said web being laterally spaced in staggered relationship to the pairs of scores on the opposite face; forming transversely extending lines of slots in the advancing web at longitudinal equidistant stations thereof with the slots in adjacent rows mutually laterally staggered; the slots of every other row being separated by the space between pairs of scores on one face of said web and the slots of the other rows being separated by the space between pairs of scores on the other face of said web; applying to opposite faces of the advancing web longitudinally extending segmental lines of adhesive material with the lines on the one face laterally spaced in staggered relationship to the line on the opposite face; folding the advancing web alternately in opposite directions on said lines of slots; stacking the folds contiguously to unite the same on said lines of adhesive material as said folded web is continuously advanced to form the web into a fan-folded article while heating said article to a temperature sufficient to cure said impregnant; steaming said article to soften the folds of the same; and immediately expanding said softened fan-folded article to form a honeycomb having a multiplicity of cells defined in part by the lines of scores.

17. Method of making a honeycomb from an elongate web, comprising the steps of: advancing the elongate web into the zone of operations; impregnating the advancing web with a thermo-setting reinforcing agent; drying said agent by passing said impregnated web through a heated zone; applying to opposite faces of the advancing web longitudinally extending lines of layer uniteable material with the lines on one face of the web laterally spaced in staggered relationship to the lines on the other face; incising the advancing web on transversely extending longitudinally equidistant segmental lines; folding the web alternately in opposite direction along said incision lines; stacking the folds contiguously to unite the same on said lines of uniteable material to form a lengthwise compact depthwise and breadthwise multi-cellular mass of a thickness equal to the distance between said incision lines; heating said web to cure said impregnate; softening the impregnated web by passing the same through a steam bath; and expanding the thus processed mass while the same is softened to form a honeycomb.

18. The method of making a honeycomb core from a web impregnated with an uncured reinforcing agent, comprising: advancing said web into the zone of operations; scoring said advancing web on opposite faces thereof with a series of longitudinal scores in pairs, the pairs of scores on one face of said web being laterally spaced in staggered relationship to the pairs of scores on the opposite face; forming transversely extending lines of slots in the advancing web at longitudinal equidistant stations thereof with the slots in adjacent rows mutually laterally staggered; the slots of every other row being separated by the space between pairs of scores on one face of said web and the slots of the other rows being separated by the space between pairs of scores on the other face of said web; applying to opposite faces of the advancing web longitudinally extending lines of adhesive material with the lines on the one face laterally spaced in staggered relationship to the lines on the opposite face; folding the advancing web alternately in opposite directions on said lines of slots; stacking the folds contiguously to unite the same on said lines of adhesive material as said folded web is continuously advanced to form the web into a fan-folded article while heating said article to a temperature sufficient to cure said impregnant; steaming said article to soften the folds of the same; and immediately expanding said softened fan-folded article to form a honeycomb having a multiplicity of cells defined in part by the lines of scores.

GUSTAVE A. UNGAR.

References Cited in the file of this patent

UNITED STATES PATENTS

| Number | Name | Date |
|---|---|---|
| 1,103,033 | Clark | July 14, 1914 |
| 1,389,294 | Dean | Aug. 30, 1921 |
| 1,906,510 | Balduf | May 2, 1933 |
| 1,924,472 | Thomson | Aug. 29, 1933 |
| 1,958,819 | Grayson | May 15, 1934 |
| 2,001,632 | Schlicting | May 14, 1935 |
| 2,209,311 | Karcher | July 30, 1940 |
| 2,428,979 | May | Oct. 14, 1947 |
| 2,581,421 | Lombard et al. | Jan. 8, 1952 |